C. M. ALT.
CORN HARVESTER.
APPLICATION FILED JAN. 27, 1913.

1,134,575.

Patented Apr. 6, 1915.
2 SHEETS—SHEET 1.

Charles M. Alt
INVENTOR

WITNESSES

C. M. ALT.
CORN HARVESTER.
APPLICATION FILED JAN. 27, 1913.
1,134,575.
Patented Apr. 6, 1915.
2 SHEETS—SHEET 2.
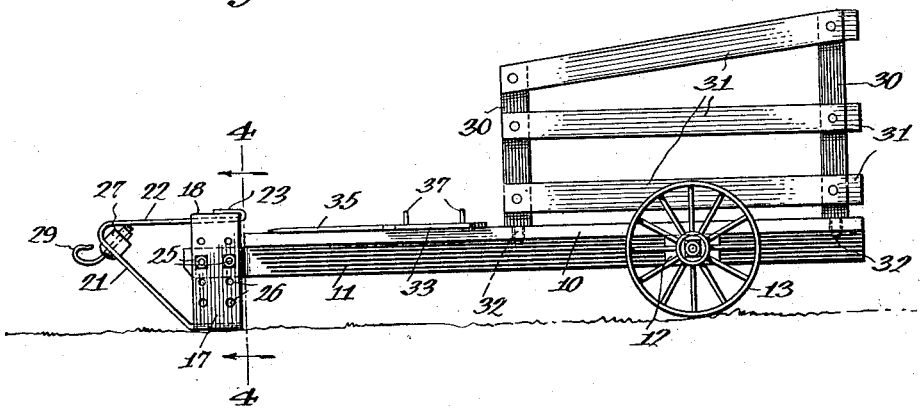
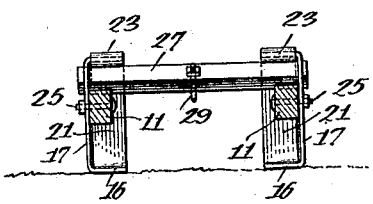
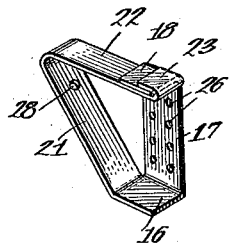
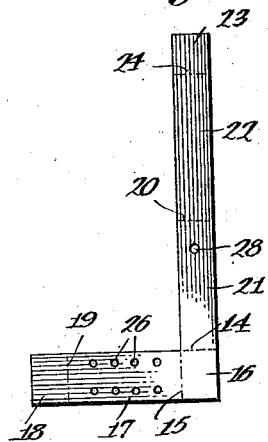
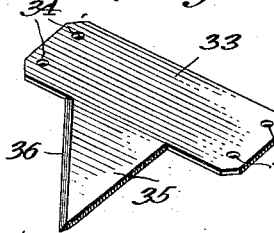
Charles M. Alt
INVENTOR
WITNESSES
Irv. L. McCathran
Ross J. Woodward
By E. E. Vrooman, Attorney

UNITED STATES PATENT OFFICE.

CHARLES M. ALT, OF BALTIMORE, OHIO.

CORN-HARVESTER.

1,134,575.  Specification of Letters Patent.  Patented Apr. 6, 1915.

Application filed January 27, 1913. Serial No. 744,476.

*To all whom it may concern:*

Be it known that I, CHARLES M. ALT, a citizen of the United States, residing at Baltimore, in the county of Fairfield and State of Ohio, have invented certain new and useful Improvements in Corn-Harvesters, of which the following is a specification, reference being had therein to the accompanying drawing.

This invention relates to corn harvester machines, and the principal object of the invention is to provide a machine which may be adjusted to cut the stalks at the height desired, and which may be used as a farm wagon or sled when not being used as a corn harvester.

Another object of the invention is to provide an improved type of support for the front of the machine which permits the vertical adjustments of the machine and which will also serve as the front runners when the machine is used as a sled.

Another object of the invention is to provide an improved type of cutting knife which is removably connected with the platform, thus permitting the knife to be used in a number of different positions.

With these and other objects in view this invention consists of certain novel combinations, constructions, and arrangements of parts as will be hereinafter fully described and claimed.

Figure 1:
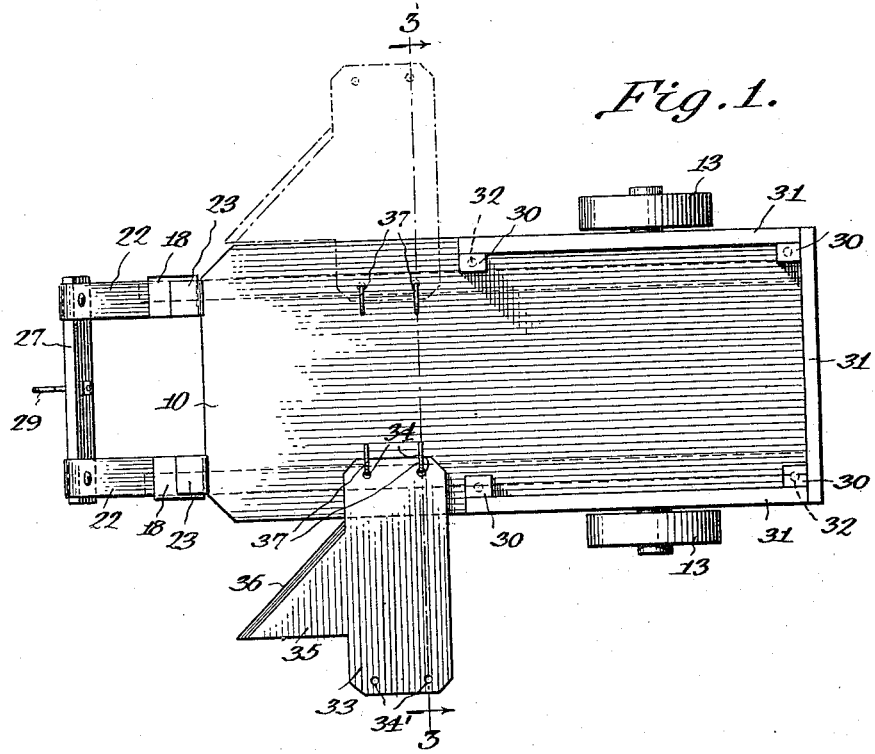
Figure 3:
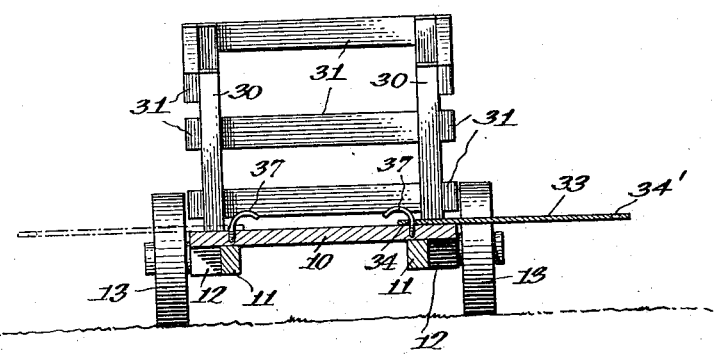

In the accompanying drawings:—Figure 1 is a top plan view of the machine having the knife connected at one side and indicated at the other side by dotted lines. Fig. 2 is a side elevation of the machine. Fig. 3 is a section along the line 3—3, in Fig. 1. Fig. 4 is a section along the line 4—4, in Fig. 2. Fig. 5 is a perspective view of one of the runners at the forward end of the machine. Fig. 6 is a view of the blank from which the runner shown in Fig. 5 is formed. Fig. 7 is a perspective view of the knife blade.

Referring to the accompanying drawings it will be seen that this invention comprises a platform 10 to the under side of which there are secured the bars 11 forming the runners when the machine is used as a sled. Blocks 12 are positioned adjacent the rear end of the machine and carry the axles upon which the supporting wheels 13 are rotatably mounted. The bars 11 extend beyond the forward end of the platform 10 in order that the forward runners may be connected with the bars. Each of these runners is formed from the blank shown in Fig. 6, which blank is substantially L-shape and has its arms bent along the dotted lines 14 and 15 to form the base section 16 of the runner. The ends of the bars 11 are secured to the standard and has its upper end 18 bent inwardly along the dotted line 19. The remaining arm is carried diagonally upwardly and outwardly, and then bent inwardly along the dotted line 20 to form the nose 21, the upper section 22 of which is carried beneath the inturned end 18 and has its end 23 bent over the end 18 along the dotted line 24. These runners are preferably formed from resilient material so that they constitute a set of springs which take up the jolt, and thereby cause the machine to ride easily. The ends of the bars 11 are secured to the standards 17 by means of bolts 25 which pass through the openings 26 formed in the standards. It should be noted that by adjusting the position of the bolts 25 that the distance at which the platform is positioned above the ground may be regulated, and therefore, the height at which the stalks are cut will be controlled. It should also be noted that by removing the wheels 13 and lowering the bolts 25 to the lowest set of openings 26 that the bars 11 will rest upon the ground, thereby converting the machine into a sled. The runners are connected with a bar 27 which is secured to the runners by bolts passing through the openings 28, the bar 27 carrying a hook 29 by means of which a draft animal may be connected with the machine.

A frame is removably mounted upon the platform 10 and comprises the corner standards 30 which are connected by the bars 31 and which carry pins 32 fitting into sockets formed in the platform. It will thus be seen that if desired this frame may be removed and any suitable frame connected with the platform, thus permitting this machine to be used as a wagon of any desired type.

The blade which is used in connection with this machine is shown in Fig. 7 and from an inspection of this figure it will be seen that the blade comprises the body portion 33 having openings 34 and 34' in the end portions. A triangular cutting blade 35 extends from the body portion 33 and is provided with a sharpened edge 36. Hooks 37 are carried by the platform 10 and are so located that the distance between the hooks and the side edges of the platform is approximately the same as the distance between the ends of the base 33 and the base of the cutting blade 35. When this cutting blade is connected with the platform it may be connected as shown in full lines shown in Fig. 1 or as indicated by the dotted lines shown in Fig. 1. If placed as shown in full lines in Fig. 1 the point of the cutting blade will be away from the platform and the stalks will thus be guided in toward the machine when cut. If the blade is placed as indicated by the dotted lines the stalks will be cut equally as well as in the position shown in full lines, but weeds and mud will be prevented from jamming in the space between the edge of the platform and the cutting blade. It is, therefore, evident that the person operating the machine will place the blade in the position which will operate the best according to the type of ground he is working upon.

When using this device the machine is driven to the field and the bolts 25 adjusted to place the blade at the height at which it is desired to cut the stalks. The machine is then driven across the field with the blade engaging the stalks to cut the same. One workman stands at the forward portion of the platform until he has cut as many stalks as he can conveniently carry and then walks to the rear portion of the machine and places the stalks in the frame carried by the platform. As soon as he leaves the forward end of the machine a second workman takes his place and gathers the stalks until he has gathered an arm full and his place is then taken by the first man. When the machine arrives at the end of a row the stalks are removed from the frame and stacked at the edge of the field. The stacks of stalks will, therefore, be placed at the edge of the field and the field can then be replanted with grain or anything else desired, and it will not be necessary for the workmen to walk across the field in order to gather the stacks of corn stalks. This will, therefore prevent the young grain from being trampled down and also saves the workmen a great deal of time in gathering the stalks. If the machine is not being used for harvesting the corn the frame may be removed from the platform and a suitable frame put in its place in order that the device may be used as a farm wagon. The wheels may also be removed and the bolts 25 lowered, thus converting the device into a sled for winter use.

Having thus described the invention what is claimed as new, is:—

A device of the class described comprising a support, hooks secured to said support and extending upwardly from the upper face of said support, said hooks being spaced inwardly from the edge of said support, said hooks provided with over-turned ends spaced from the upper face of said support, a reversible cutting blade provided with projecting end portions having apertures formed therein, said apertures adapted to engage said hooks whereby said blade will be detachably held upon said support, a substantially V-shaped cutting point carried by said blade and projecting forwardly therefrom, and said end portions projecting inwardly from the sides of said support for constituting means for holding said cutting blade substantially parallel with the bottom of said support.

In testimony whereof I hereunto affix my signature in presence of two witnesses.

CHARLES M. ALT.

Witnesses:
W. W. FOLTZ,
GEO. H. LOHR.

Copies of this patent may be obtained for five cents each, by addressing the "Commissioner of Patents, Washington, D. C."